United States Patent [19]

Nagai

[11] Patent Number: 4,524,853
[45] Date of Patent: Jun. 25, 1985

[54] CLUTCH BRAKE ARRANGEMENT FOR FARM WORK MACHINERY OR OTHER EQUIPMENT

[75] Inventor: Shigeo Nagai, Nagano, Japan

[73] Assignee: Nisshin Kogyo Kabushiki Kaisha, Japan

[21] Appl. No.: 345,647

[22] Filed: Feb. 4, 1982

[30] Foreign Application Priority Data

Feb. 6, 1981 [JP] Japan .................. 56-16427
Feb. 9, 1981 [JP] Japan .................. 56-17805
Mar. 31, 1981 [JP] Japan .................. 56-48123

[51] Int. Cl.³ ............................................ B60K 41/24
[52] U.S. Cl. ........................... 192/18 R; 192/107 R
[58] Field of Search .............. 192/12 R, 17 R, 18 R, 192/30 V, 107 R; 56/11.3, 11.8

[56] References Cited

U.S. PATENT DOCUMENTS

| | | | |
|---|---|---|---|
| 3,650,361 | 3/1972 | Fossum | 192/30 V |
| 4,286,701 | 9/1981 | MacDonald | 192/18 R |
| 4,313,293 | 2/1982 | Nagai | 56/11.3 |
| 4,352,266 | 10/1982 | Lloyd et al. | 56/11.3 |
| 4,372,433 | 2/1983 | Mitchell et al. | 56/11.3 |

FOREIGN PATENT DOCUMENTS

826391 1/1952 Fed. Rep. of Germany .... 192/18 R

*Primary Examiner*—George H. Krizmanich
*Attorney, Agent, or Firm*—Cantor and Lessler

[57] ABSTRACT

A clutch brake arrangement for farm work machinery or other equipment comprises a rotary member rotatably attached to an output shaft extending through a cam plate mounted on an engine mounting. A pressure plate is mounted on the cam plate in such a manner that it is movable along said output shaft. A brake spring is provided to bias the pressure plate toward the rotary member. A lining plate is disposed between the rotary member and a clutch disc rotatable with the output shaft. A clutch spring is provided to bias the lining plate toward the clutch disc to engage it with the pressure plate. The pressure plate is moved toward the cam plate against the brake spring, so that the lining plate is engaged with the clutch disc and, thereafter, is spaced away from the pressure plate. A plurality of projections are discontinuously formed on the peripheral portion of the pressure plate which is outside of its braking plane.

7 Claims, 15 Drawing Figures

CLUTCH BRAKE ARRANGEMENT FOR FARM WORK MACHINERY OR OTHER EQUIPMENT

BACKGROUND OF THE INVENTION

The present invention relates to a clutch brake arrangement for farm work machinery or other equipment.

For example, when a power-operated lawn mower is moved to cut the grass in different places, it is necessary to stop rotation of the cutting tool while keeping the engine at an idle to save the labor involved in re-actuation of the engine and for safety's sake.

A clutch brake using a friction belt and the like has been employed to effect the above-mentioned operation. However, the clutch brake of this type has a complicated structure which inevitably renders the overall arrangement larger. In addition, an increased load is applied on the engine in converting it from an idle state to a clutch engagement state. Such an overload does not permit smooth engagement of the clutch, and is apt to cause the engine to stop. Thus, it is still impossible to apply the clutch brake to an engine of small capacity.

SUMMARY OF THE INVENTION

The present invention is directed to providing a solution to the above-mentioned problems.

An object of the present invention is to provide a clutch/brake arrangement which reduces the load applied on an engine in converting it from an idle state to a clutch engagement state, permits smooth clutch engagement without an engine stop, assures reliable braking with release of clutch engagement, is manufactured at low costs due to its simple construction, and is of small size and light weight.

According to the present invention, this is achieved by provision of a clutch/brake arrangement for farm work machinery or other equipment, comprising a rotary member rotatably attached to an output shaft extending through a cam plate mounted on an engine mounting, a pressure plate mounted on said cam plate in such a manner that it is movable along said output shaft, a brake spring adapted to bias said pressure plate toward said rotary member, a lining plate disposed between said rotary member and a clutch disc rotatable with said output shaft, said lining plate being rotatable with said rotary member and movable along said output shaft, a clutch spring adapted to bias said lining plate toward said clutch disc to engage it with said pressure plate, a cam plate cover provided in opposition to said cam plate through a cam ball, and an operating rod for turning said cam plate cover, whereby said pressure plate is moved toward said cam plate against said brake spring, so that said lining plate is engaged with said clutch disc, and thereafter, is spaced away from said pressure plate.

Another object of the present invention is to provide a clutch brake arrangement which reduces as much as possible the load applied on an engine in converting it from an idle state to a clutch engagement state, permits smooth clutch engagement without an engine stop, assures reliable braking with release of an operating rod, and is of small size and light weight.

According to the present invention, this is achieved by provision of a clutch/brake arrangement for farm work machinery or other equipment, comprising a cam plate fixed to an engine mounting and a cam plate cover rotatable by operation of an operating rod, which are fitted over an output sharft and arranged in opposite relation, a cam ball received in inclined ball clamps provided on said opposite cam plate and cam plate cover, turning of said cam plate cover causing said cam ball to roll over, so that it is moved around said output shaft, a pressure plate interposed between said cam plate and a lining plate attached rotatably to said output shaft, said pressure plate having a retainer portion which is engaged with said cam plate in such a manner that it is movable along said output shaft and has its upper end fixed rotatably to said cam plate cover, and a brake spring adapted to bias said pressure plate toward said lining plate so that said lining plate is spaced away from a clutch disc, while said cam plate cover is pressed toward said cam plate, whereby said cam plate cover is rotated in its operating direction, so that said pressure plate is moved toward said cam plate against said brake spring, while said lining plate is engaged with said clutch disc, and, thereafter, said pressure plate is spaced away from said lining plate.

A further object of the present invention is to provide a clutch brake arrangement for farm work machinery or other equipment which is designed in such a manner that, when a push is given to a pressure plate, a lining plate is engaged with a clutch disc rotatable with an output shaft of an engine to rotate a rotary member and, when the pressure plate is restored to its initial position, the rotating lining plate is pushed by a clutch plate so that it is spaced away from the clutch disc for braking, wherein a plurality of projections are discontinuously formed on the peripheral portion of said pressure plate which is outside of its braking plane.

According to this arrangement, the brake can be put on in a rapid and reliable manner and braking noises or local abrasion of the brake lining can be eliminated or reduced substantially, since it is possible to prevent effectively generation of vibration and its increase due to resonance, when the brake is applied on the lining plate rotating with the output shaft by means of the pressure plate. Such vibrations take place in the case where the braking plane of the pressure plate is distorted, or it suffers thermal deformation during braking. Such thermal deformation may occur even if the braking plane is of high accuracy. The arrangement thus works well over extended periods of time.

BRIEF DESCRIPTION OF THE DRAWINGS

Other features and advantages of the present invention will become apparent from a reading of the following detailed description with reference to the accompanying drawings:

FIGS. 1 to 3 show one embodiment of the present invention which is applied to a power-operated lawn mower, in which

FIGS. 4 to 9 show another embodiment of the present invention which is applied to a power-operated lawn mower, in which

FIGS. 10 to 12 show a further embodiment designed to facilitate the removal of grass or other matters which may enter the arrangement applied to a power-operated lawn mower, in which

FIGS. 13 to 15 show a still further embodiment designed to render it easy to remove grass, earth and sand, mud and the like which may enter the arrangment applied to a power-operated lawn mower and to guide an amount of oil leaking through the engine to a discharge outlet, in which

Reference will now be made to one embodiment according to the present invention, which is shown to be applied to a power-operated lawn mower.

Figure 1:
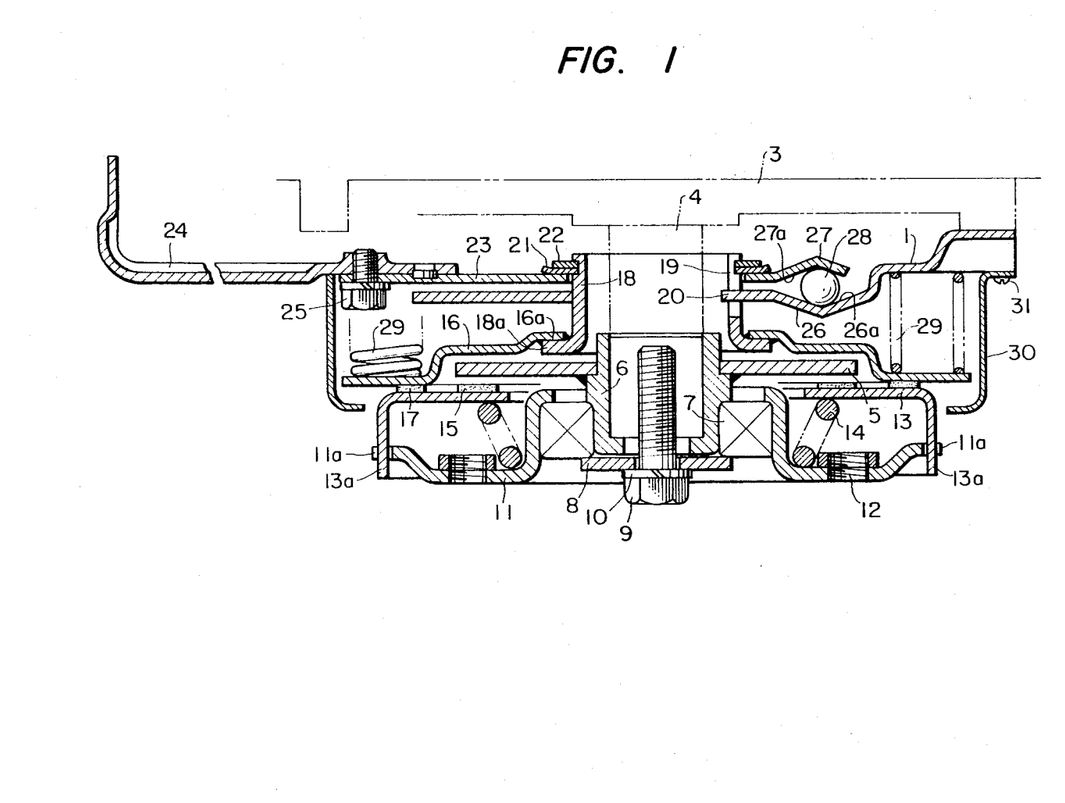
FIG. 1 is a front view in section.
Figure 2:
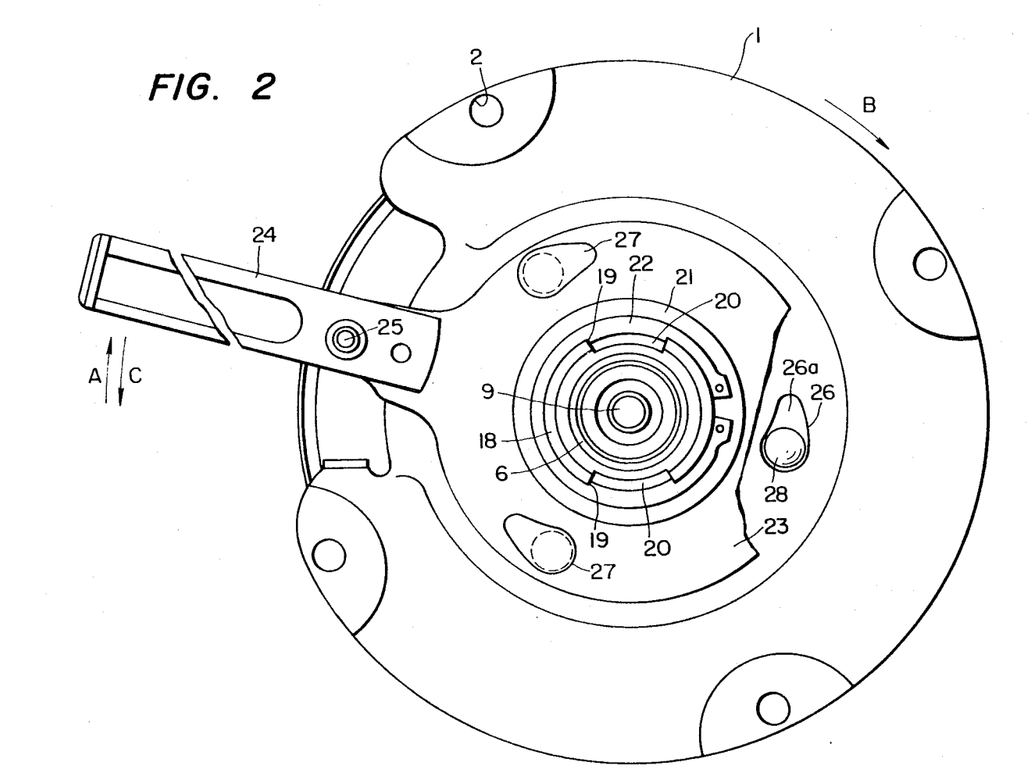
FIG. 2 a partially cut-away plan view.
Figure 3:
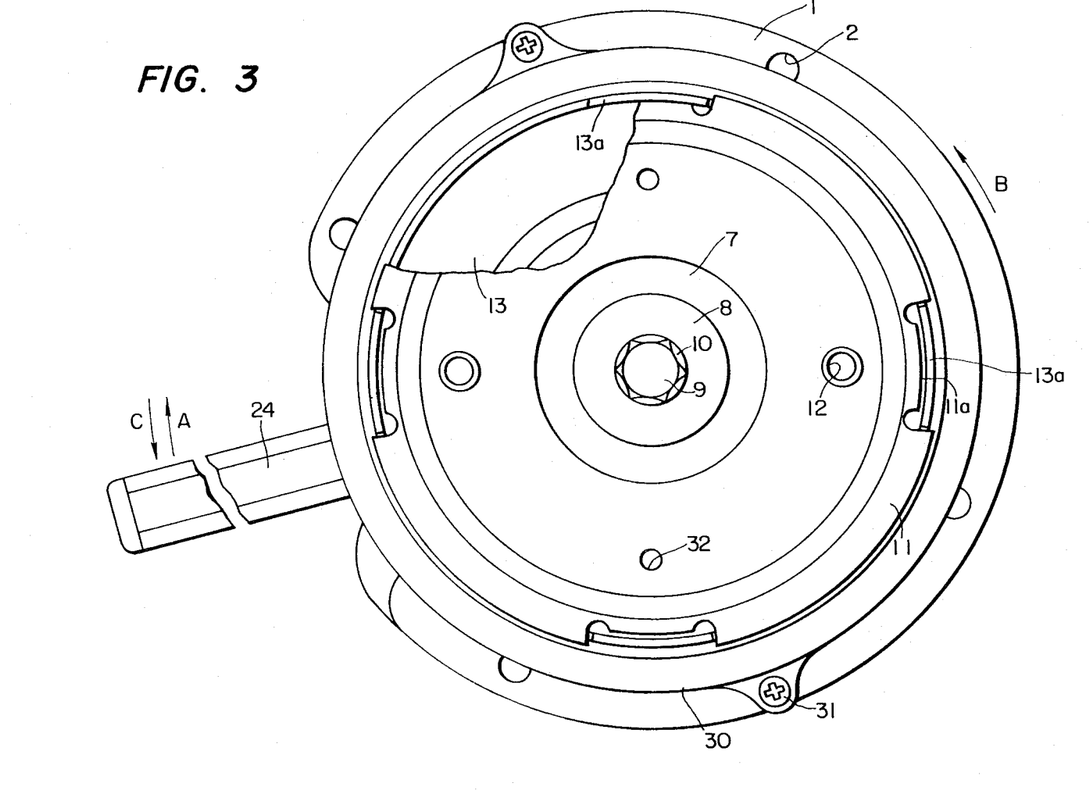
FIG. 3 a partially cut-away bottom view.

Referring to FIG. 1 to 3, a cam plate 1 is fixed to the underside of an engine mounting 3 by clamp bolts (not shown) inserted through mounting holes 2 formed in the peripheral edge thereof. An output shaft 4 extends downwardly through the central portion of the cam plate 1 to a crank shaft (not shown) of an engine. A clutch disc 5 is fixed to a collar member 6 which is fitted over the lower end of the output shaft 4. The collar member 6 is fixed in place by threading a fixing bolt 9 through a washer 8 for retaining the member 5 and a bearing 7 fitted over its periphery and a spring washer 10 into the lower end of the shaft 4, so that the clutch plate is rotatable with the output shaft 4. A rotary member 11 is rotatably mounted on the output shaft 4 through the bearing 7, and a cutting edge (not illustrated) is fixed to the outer face of its bottom by means of a cap screw (not shown) threaded into a corresponding threaded hole 12 in such a manner that it is rotatable therewith. A lining plate 13 is disposed between the rotary member 11 and the clutch disc 5, and includes on its periphery four guide pieces 13a which are bent toward the rotary member 11. These guide pieces are fitted into four associated grooves 11a formed in the periphery of the member 11, so that the lining plate is rotatable with the member 11 and movable along the output shaft 4. A clutch spring 14 is biasedly provided between the rotary member 11 and the lining plate 13, and serves always to bias the plate 13 toward the clutch disc 5, whereby a clutch lining 15 fixed to the lining plate 13 engages with the clutch disc 5. A pressure plate 16 is disposed between the cam plate 1 and the lining plate 13 in opposed relation to a brake lining 17 fixed to the lining plate 13, with its inner portion being secured to a flange portion 18a of a retainer 18 inserted over the output shaft 4. The retainer 18 is supported on a cam plate cover 23 by a thrust plate 21 and a keeping member 22 fixed to its upper end and projections 20 extending from the inner periphery of the cam plate 1 and fitted into two opposed guide grooves 19 formed axially in the retainer 18. An operative rod 24, which is designed to turn the cam plate cover 23, is fixed to the cover by means of a bolt 25. The face of the cam plate 1, which is opposed to the cam plate cover 23, is provided at equal intervals with three ball clamps 26 inclined in a direction counter to the operating direction of the rod 24. On the other hand, the face of the cam plate cover 23, which is opposed to the cam plate 1, is provided at equal intervals with ball clamps 27 which incline in the operating direction of the rod 24. A cam ball 28 is provided between each ball clamp 26 and its associated clamp 27 in such a manner that it rolls over their inclined planes 26a and 27a. When the ball 28 is in the lowermost and uppermost positions of the ball clamps 26 and 27, the cam plate cover 23 is in a position nearest to the cam plate 1, which is here taken as the initial position of the operating rod 24. Between the cam plate 1 and the pressure plate 15, there are six brake springs 29 which serve always to bias the pressure plate 16 toward the lining plate 13. The forces exerted by these springs are then larger than a force exerted by the clutch spring 14. With this arrangement, the cam plate cover 23 is always biased toward the cam plate 1 via the thrust plate 21, so that the cam ball 28 is held in the lowermost and uppermost positions of the ball clamps 26 and 27 at the initial position of the operating rod 28, while the brake lining 17 of the lining plate 13 is engaged with the pressure plate 16, whereby the clutch lining 15 is spaced away from the clutch disc 5. Reference numeral 30 stands for a cover mounted on the cam plate 1 by means of a screw 31, and 32 a water discharge hole formed in the rotary member 11.

The aforesaid embodiment operates as follows: The cam ball 28 is placed in the lowermost and uppermost positions of the ball clamps 25 and 27 in a braking state where the brake springs 29 are stretched due to their preset loads, as illustrated in FIG. 1. The distance between the cam plate cover 23 and the cam plate 1 is minimal, and the operating rod 24 is at its initial position. On the other hand, the lining plate 13 is urged by the pressure plate 16 to cause contraction of the clutch spring 14, so that the clutch lining 15 is spaced away from the clutch disc 5. Even though the engine is at work, therefore, the output shaft 4 and the clutch disc 5 remain raced, so that no rotational force is transmitted to the rotary member 11. This assures that the cutting edge (not shown) is kept stationary, and the engine runs idle.

To provide for rotation of the cutting edge, a pull is given to a cable (not shown) connected to the operating rod 24 to rotate it in a direction indicated by an arrow A in FIGS. 2 and 3, so that the cam plate cover 23 turns relative to the fixed cam plate 1. The cam ball 28 then rolls upwardly over the inclined planes 26a and 27a of the ball clamps 26 and 27, whereby the cam plate cover 23 is rotated and spaced away from the cam plate 1, with the result that the retainer 18 locked to the cam plate cover 23 by means of a locking plate 21 is guided by the projection 20 fitted into the guide groove 19 to an upper position without suffering any rotation. This causes movement of the pressure plate 16 toward the cam plate 1 against the brake springs 29. As the plate 16 moves, the lining plate 13 moves toward the clutch disc 5, while it comes into contact with the pressure plate 16 due to the spring force of the clutch spring 14. When the clutch lining 15 touches the clutch disc 5, the lining plate 13 starts to slide and rotate in response to rotation of the disc 5, and reaches a so-called semi-clutched condition. Furthermore, contraction of the brake springs 29 causes the clutch spring 14 to be stretched, so that the clutch lining 15 comes in engagement with the clutch disc 5, resulting in an increase in the rotational force of the lining plate 13. When the pressure plate 16 is then brought to a further upper position, it is spaced away and, finally, disengaged from the brake lining 17. As a consequence, the lining plate 13 starts to turn with the clutch disc 5 for achieving clutch engagement. This permits the power of the output shaft 4 to be transmitted to the rotary member 11 via the collar member 6, the clutch disc 5 and the lining plate 13, so that the cutting edge rotates in a direction indicated by an arrow B in FIGS. 2 and 3.

Release of the cable causes the pressure plate 16 to be pushed down (in FIG. 1) due to the restoring force of the brake spring 29, so that the pressure plate 16 comes in engagement with the lining plate 13 for braking. At the same time, the lining plate 13 is pushed down to space the clutch lining 15 away from the clutch disc 5, so that connection of the lining plate 13 to the clutch disc 5 is broken off. The brake is thus applied on the rotation of the lining plate 13, so that the rotation of the cutting edge is stopped.

The operating rod 24 then turns together with the cam plate cover 23 in a direction indicated by an arrow C in FIGS. 2 and 3, and returns to its initial position, and the cam ball 28 is held in the lowermost and uppermost positions of the ball clamps 26 and 27.

With this arrangement, a load to be impressed on the engine during clutch engagement can be reduced as much as possible, since the lining plate is engaged with the clutch disc rotating with the output shaft due to the contraction of the brake spring and the extension of the clutch spring and, at the same time, the pressure plate is disengaged from the lining plate for clutch engagement. In addition, clutch engagement is smoothly accomplished, and the power of the engine can reliably be transmitted to the rotary member without an engine stop, even through the engine is of small capacity.

Release of the operating rod also causes automatic movement of the pressure plate owing to the restoring force of the brake springs, so that the brake is put on simultaneously with disengagement of the lining plate from the clutch disc. Thus, the rotation of the rotary member can be stopped in a rapid and reliable manner.

As discussed above, the foregoing arrangement requires a considerably limited number of the parts involved, and can be manufactured in a simple manner and at low production cost. The arrangement is also of light weight, and easy to handle. Furthermore, the structure for moving the pressure plate along the output shaft is of simple construction, and works reliably and satisfactorily. Accordingly, the power of the engine can reliably be transmitted to the rotary member without an engine stop, even tough the engine is of small capacity.

According to the first arrangement of the present invention, the brake is put on simultaneously with clutch disengagement by releasing the operating rod to move the pressure plate via the brake springs and giving a push to the lining plate. Thus, the rotation of the rotary member can be stopped in a rapid and reliable manner, and the operating rod can reliably be restored to its initial position by moving the cam plate cover toward the cam plate.

Referring to FIGS. 4 to 9, there is shown a second embodiment or arrangement of the clutch/brake device for farm work machinery or other equipment, which is designed in such a manner that, when the pressure plate is pushed, the lining plate is engaged with the clutch disc rotating with the output shaft of an engine to rotate the rotary member, and when the pressure plate is restored to its initial position, the rotating lining plate is pushed by the clutch plate to disengage it from the clutch disc and, at the same time, to apply the brake.

This arrangement is characterized in that a plurality of projections are discontinuously formed on the peripheral edge of the pressure plate, outside of its braking surface. According to this arrangement, the brake can be applied in a rapid and reliable manner and braking noises or local abrasion of the brake lining can be eliminated or reduced substantially. Thus, it is possible to prevent effectively the generation of vibration and its increase due to resonance, when the brake is applied on the lining plate rotating with the output shaft by means of the pressure plate. Such vibration takes place when the braking plane of the pressure plate is distorted, or it suffers thermal deformation during braking. Such thermal deformation may occur even if the braking plane is of high accuracy. This arrangement thus works well over extended periods of time.

Figure 6:
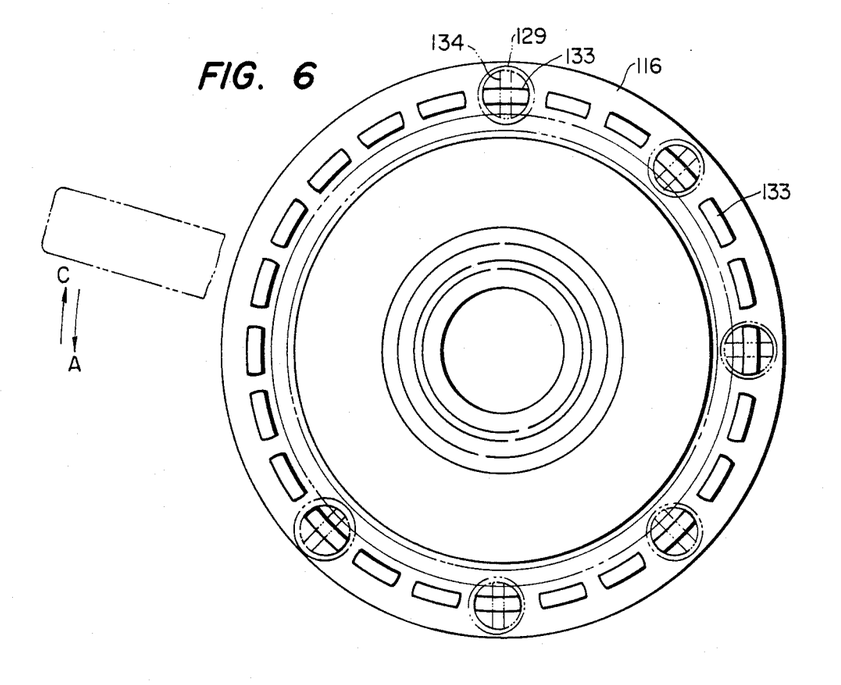
FIG. 6 a plan view of the pressure plate, FIG. 7 a partial plan view of another embodiment of the pressure plate, FIG. 8 a partial plan view of a further embodiment of the pressure plate.

A pressure plate 116 has a plurality of projections 133 on a plane opposite to its braking plane 116c, said projections being formed by press. As shown in FIG. 6, a plurality of elongate projections 133 are discontinuously formed on the peripheral edge of the pressure plate which is outside of the braking plane 116c.

When the brake is applied by engagement of the pressure plate 116 with a lining plate 103 rotating with a clutch disc 105, the pressure plate 116 may vibrate in the case where its braking plane is of poor accuracy or suffers thermal deformation. Due to the presence of these projections 133, however, such vibrations vary and eventually offset each other, so that their resonance and amplification are effectively avoided.

Figure 7:
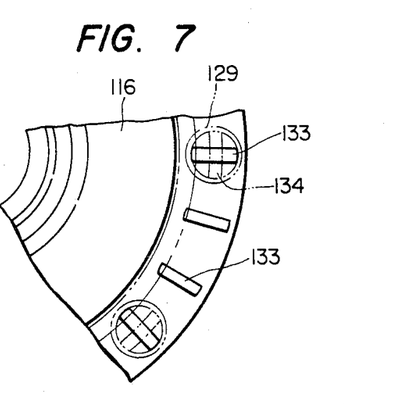

According to another embodiment shown in FIG. 7, elongate projections 133 are placed in such a manner that they are orientated in the radial direction of the pressure plate 116.

Figure 8:
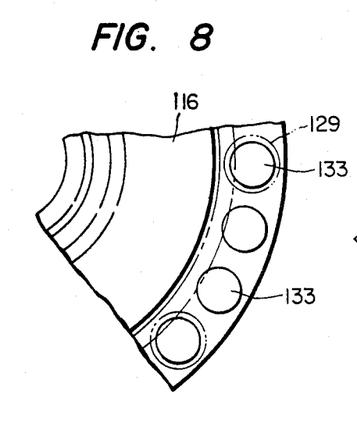

According to a further embodiment shown in FIG. 8, each projection 133 is of a circular shape.

It is noted that the projections 133 are not limited to the aforesaid shapes. The projections may extend alternately in opposite directions or toward the braking plane 116c.

Figure 4:
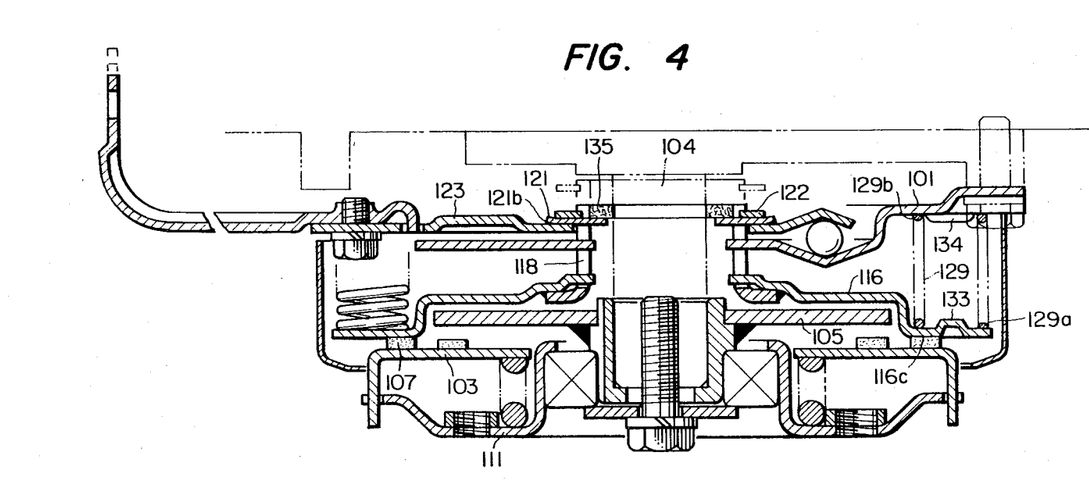
FIG. 4 is a front view in section.
Figure 5:
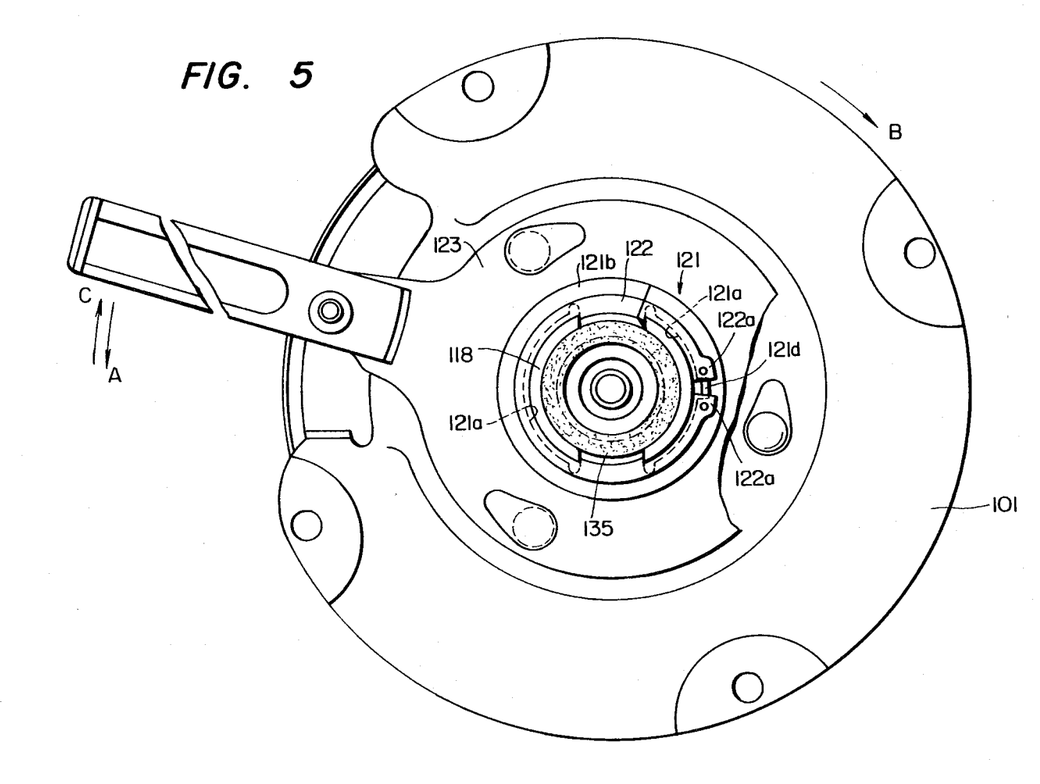
FIG. 5 a partially cut-away plan view.

A brake spring 129 has its one end 129a locked to each projection 133 and its other end 129b locked to each projection 134 formed on a cam plate 101 across the relative projection 133, and serves always to bias the pressure plate 116 toward lining plate 103.

Accordingly, when the brake is applied to the lining plate 105 rotating with the output shaft 104 plate, the pressure plate 105 has a sufficient braking effect, so that the rotary member 111 can be stopped in a rapid and reliable manner, and braking noises and local abrasion of the brake lining 107 can be reduced or eliminated. This is because, even when the pressure plate 105 vibrates due to the poor accuracy or thermal deformation of its braking plane, such vibration is varied by the presence of a plurality of projections 133 discontinuously formed on the peripheral edge of the pressure plate outside of its braking plane, with the result that the vibrations of the pressure plate 105 offset each other.

Figure 9:
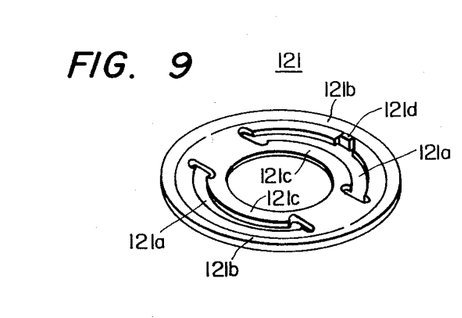
FIG. 9 a perspective view of the thrust plate.

As shown in FIG. 9, a thrust plate 121 is in the form of a ring. This ring-shaped plate is provided with a pair of opposed part-circular openings 121a through which a retainer 118 for the pressure plate 116 is inserted. The portion of this plate outside of the openings defines a thrust portion 121b which is to be interposed between a locking member 122 and a cam plate cover 123, while the portion of this plate inside of the opening defines a portion for receiving a dust seal 135 to be disposed inside of the retainer 118. A projection 121d is further provided on the thrust portion 121b, which engages with the locking member 122.

The thrust plate 121 is held in place by inserting the openings 121a over the upper end of the retainer 118. A thrust load is received on the thrust portions 121b, so that the cam plate cover 123 rotates smoothly and reliably. As the projection 121d is held in place between both ends 122a of the locking member 122, there is no possibility that rotation of the cam plate cover 123 causes turning of the locking member 122. This means that disengagement of the locking member is avoided. In addition, no dust and dirt enter the arrangement from the upper end of the retainer 118 and from between the retainer 118 and the openings 121 in the thrust plate 121, since a dust seal 135 is fixed to the portions 121c by suitable means.

Figure 10:
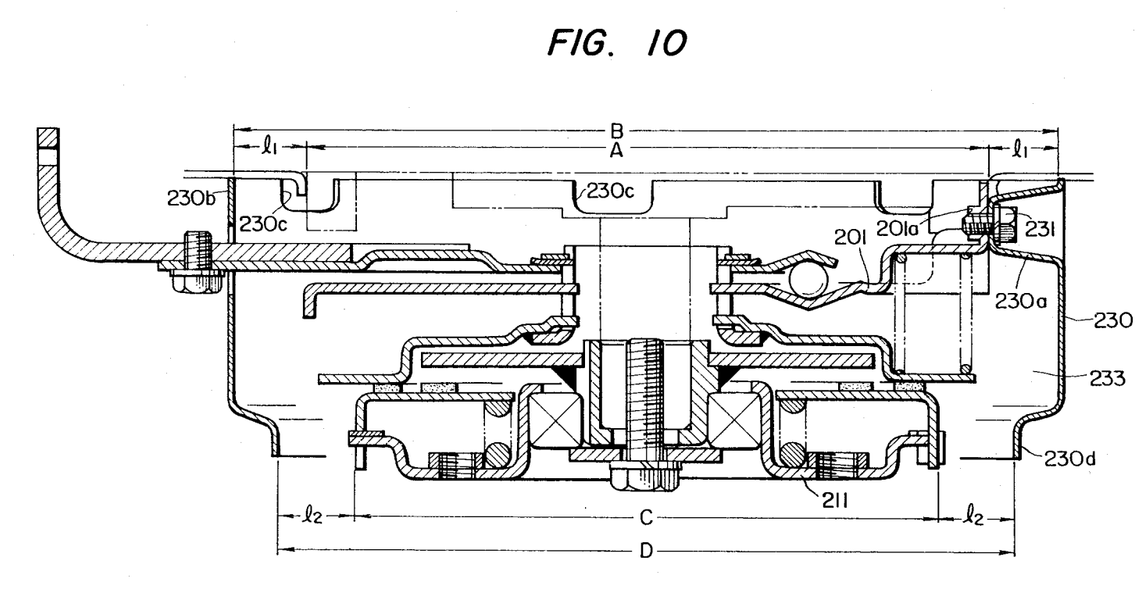
FIG. 10 is a front view in section.
Figure 11:
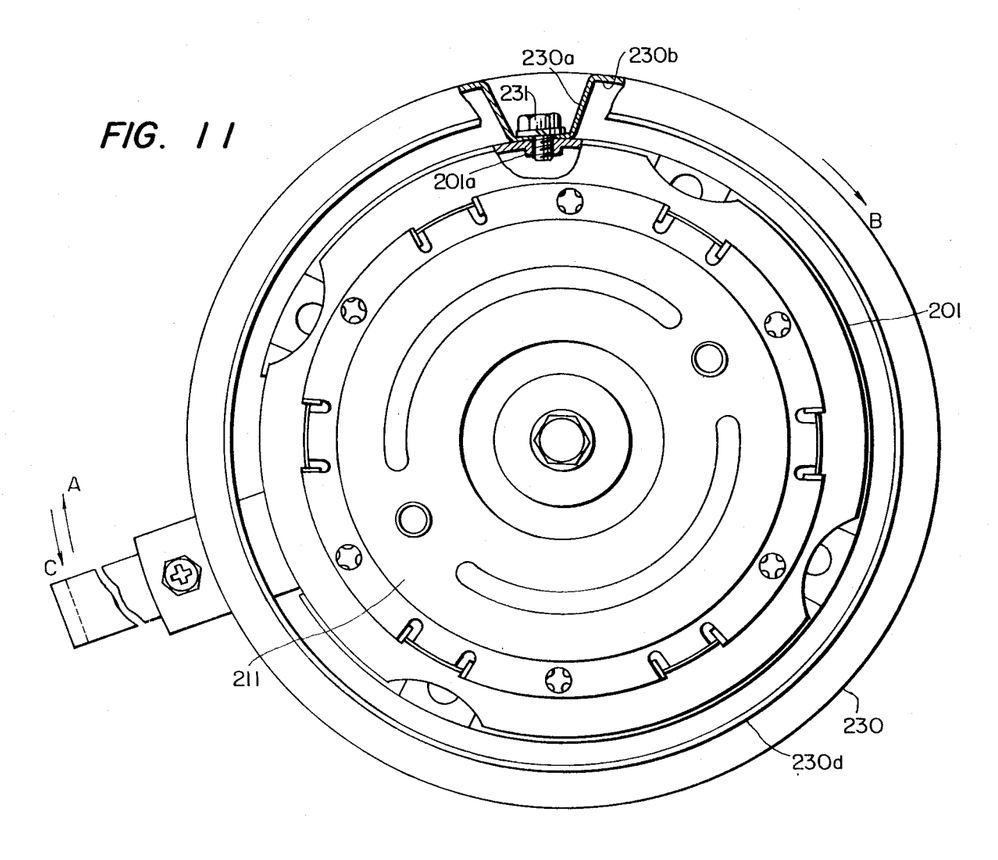
FIG. 11 a partially cut-away bottom view.
Figure 12:
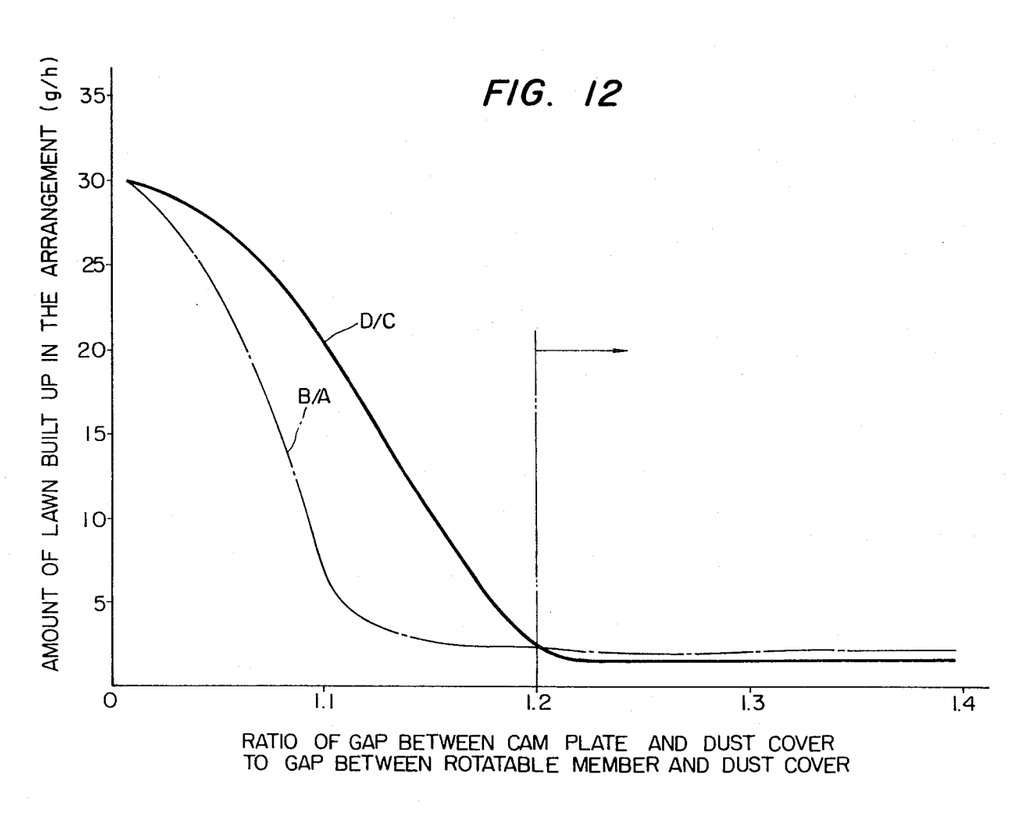
FIG. 12 a graphical view indicating the relationships between the amount of grass built-up (g/h) in the arrangement and the gap ratios between the dust cover and the cam plate and the rotary member, respectively.

Referring to FIGS. 10 to 12, there is a shown a third embodiment or arrangement which is applicable to farm work machinery or other equipement. This arrangement is designed to work well over long periods of time by making it easy to discharge a lump of grass etc., which may enter the arrangement.

The prior art devices of this type have a dust cover adapted to close gaps with a view for preventing grass or the like from entering the arrangement during operation. However, difficulties are still encountered in closing up these gaps to perfection. Accordingly, there is always a fear that grass may enter the arrangement through unsealed small gaps, resulting in a build-up of a clump of grass which hampers smooth operation of working mechanisms.

Thus, the third arrangement according to the present invention is characterized in that a cylindrical dust cover is provided for a cam plate fixed to a body and a rotary member rotatable with an output shaft, said dust cover being mounted on said cam plate, and in that a gap between the cam plate and the dust cover is set to 1.2 or more in terms of a ratio of the diameter of the cam plate to that of the dust cover, whereas a gap between the rotary member and the dust cover is set to 1.2 or more in terms of a ratio of the diameter of the rotary member to that of the dust cover.

With this arrangement, it is possible to easily remove grass or clumps of grass from a gap defined between the rotary member and the dust cover by making use of the negative pressure produced by rotation of the rotary member, even when the grass or its clump enters the arrangement through the gap. This renders it possible to avoid a build-up of grass etc. in the arrangement, and assures good operation over extended periods of time.

A cylindrical dust cover 230 has on its upper portion several recessed mountings 230a projecting toward a cam plate 201. The dust cover 230 is held in place by clamping vertical pieces 201a formed on the cam plate 201 into the mountings 230a by means of bolts 231.

The dust cover 230 is provided in its upper opening 230b with a notch 230c, and has its lower opening 230d formed to a smaller diameter.

A gap $l_1$ between the cam plate 201 and the upper opening 230b in the dust cover is set to 1.2 or more in terms of the ratio of the diameter of said opening to the diameter A of said plate, whereas a gap $l_2$ between the rotary member 211 and the lower opening 230d is set to 1.2 or more in terms of a ratio of the diameter D of said opening to the diameter C of said member. As a result, the gaps $l_1$ and $l_2$ are in communication with the area between the working portion of the clutch/brake arrangement and the dust cover 230 to form an air duct 233.

Even when an amount of grass cut down by the cutting edge is repelled by the cutting edge, and enters the clutch/brake arrangement from the outer portion of the dust cover 230 through the upper opening 230b and the notch 230c, said amount of grass is sucked vigorously in an air stream in the duct 233, which flows downwardly due to a negative pressure generated by rotation of the rotary member 211 in the vicinity of the lower opening, and leaves the gap $l_2$ between the rotary member 211 and the lower opening 230d in the dust cover. Thus, a build-up of grass in the clutch/brake arrangement can effectively be prevented.

FIG. 12 shows the results of testing carried out on this embodiment, which idicates that, given B/A and D/C ratios of 1.2, the amount of grass built up in the clutch/brake arrangement is about 2.5 grams per hour. From this graphical view, it is evident that, if the gaps $l_1$ and $l_2$ are set to 1.2 in terms of B/A and D/C ratios, the amount of grass accumulated per hour is reduced more considerably than achieved with the prior art.

Thus, the gaps $l_1$ and $l_2$ between the dust cover and the cam plate and the rotary member, respectively, may advantageously be adjusted to 1.2 or more in terms of the aforesaid ratio in this embodiment.

Figure 13:
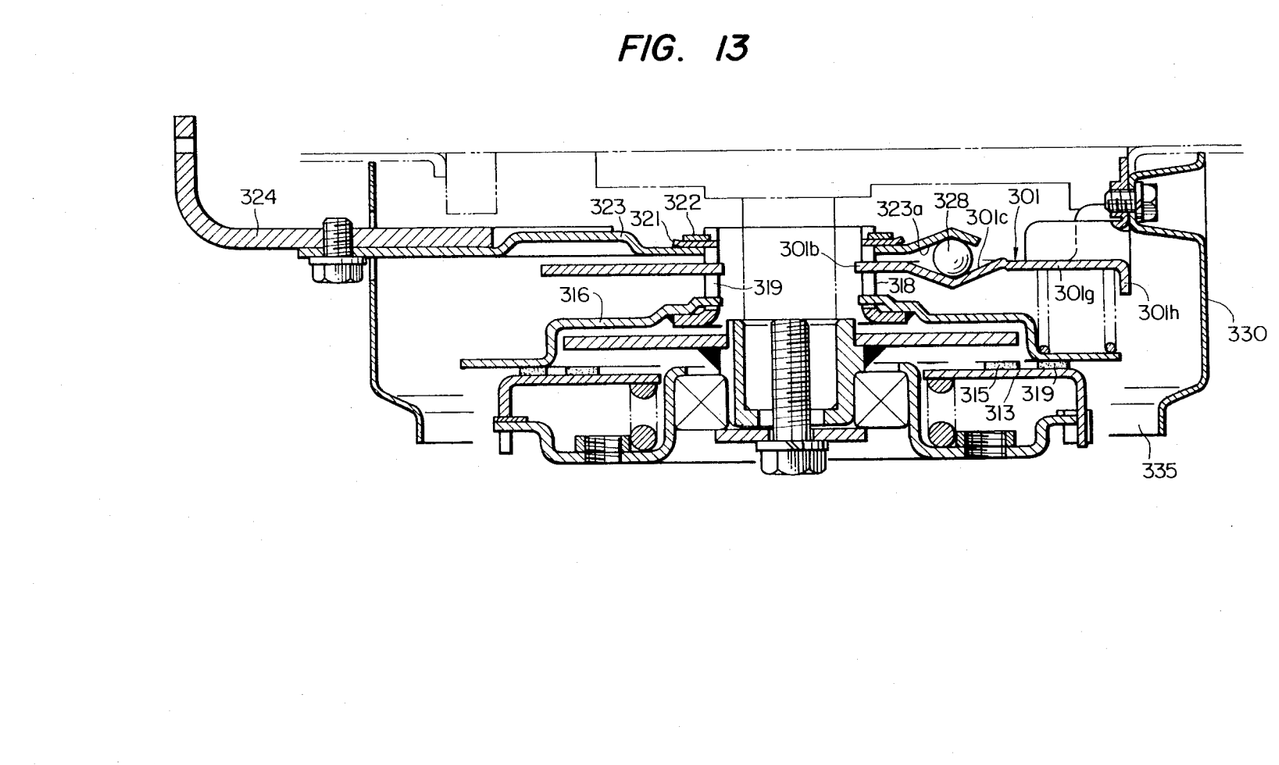
FIG. 13 is a front view in section.

A fourth embodiment or arrangement which is applicable to the above-mentioned power-operated lawn mower will now be explained with reference to FIGS. 13 to 15.

This embodiment is designed to facilitate easy removal of grass, earth and sand, mud and the like which may enter the arrangement, and to prevent oil leaking through an engine from having an adverse effect on working and braking mechanisms by leading it to an oil discharge outlet.

The conventional arrangement of this type has a dust cover adapted to close up gaps with a view to preventing entrance of grass, earth and sand, mud and the like during operation. However, it is impossible as a practical matter to prevent entrance of such matters through small gaps. A build-up of such matters has an adverse influence on smooth operation of cam mechanisms. There is also a fear that an amount of oil leaks through an engine and enters braking mechanisms, resulting in an unsatisfactory braking operation.

Thus, this arrangement is characterized in that a cam plate forming the cam mechanism is provided on its middle portion with a circular flat plane for rotatably holding a cam cover; a part of a flat plane contiguous to said circular flat plane is formed to a shape substantially similar to said circular flat plane; and the outer edge of said cam plate is bent toward a discharge outlet.

With this arrangement, smooth cam operation is achieved since grass, earth and sand, mud and the like are prevented from collecting in the cam mechanism due to the fact that such matters are easily removed from the flat planes on the cam plate. Entrance of oil into the braking mechanism is also prevented with no fear of deteriorations in the braking effect, since an amount of oil coming from the engine is guided to the outer edge of the cam plate, where it is removed.

A retainer 318 is supported on a cam plate cover 323 by a thrust plate 321 and a keeping member 322 fixed to its upper end and projections 302b extending from the inner periphery of the cam plate 301 and fitted into two opposed guide grooves 319 formed axially in the retainer 318. The face of the cam plate 301, which is opposed to the cam plate cover 323, is provided with three ball clamps 326 which incline in a direction counter to the operating direction of an operating rod 324. On the other hand, the face of the cam plate cover 323, which is opposed to the cam plate 301, is provided with ball clamps 327 which incline in the operating direction of the rod 324. A cam ball 328 is disposed between each ball clamp 326 and its associated clamp 327 in such a manner that it rolls over their inclined planes 326a and 327a. When the ball 28 is in the lowermost and uppermost positions of the ball clamps 326 and 327, the cam plate cover 323 is in a position nearest to the cam plate 323, which is here taken as the initial position of the operating rod 324.

Figure 14:
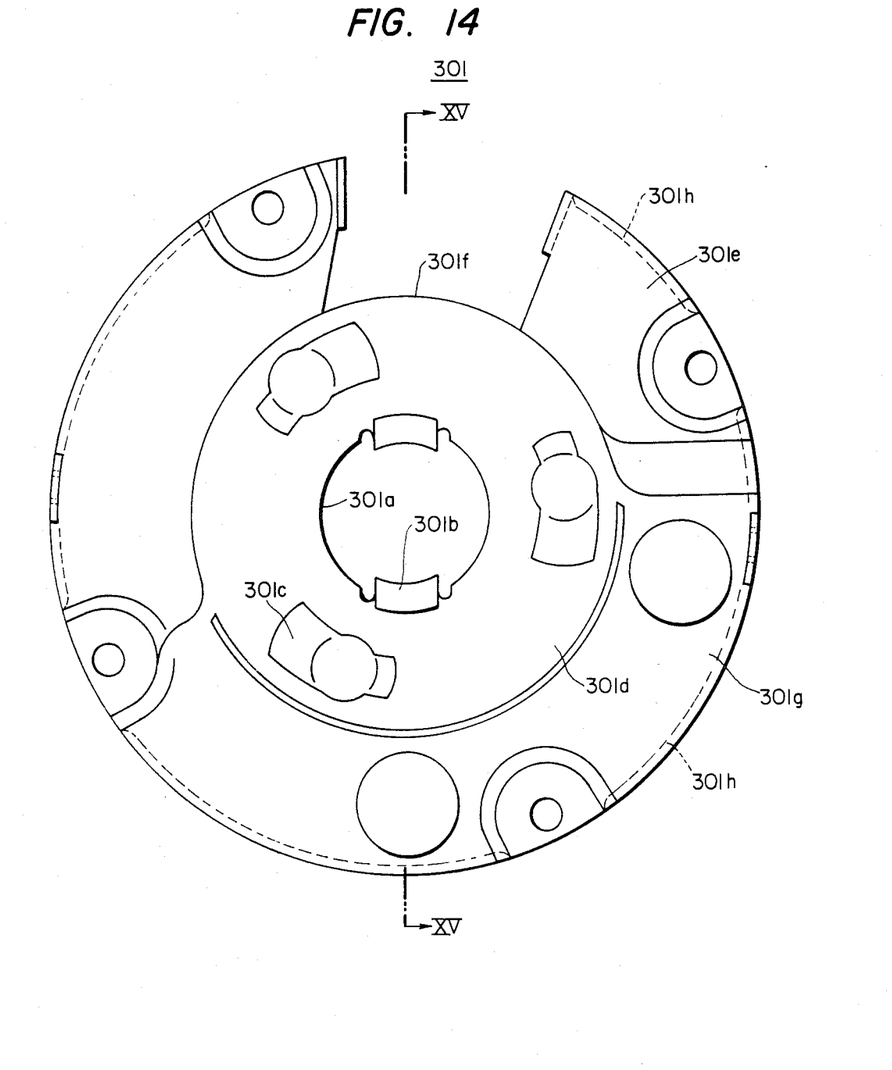
FIG. 14 a plan view of the cam plate.
Figure 15:
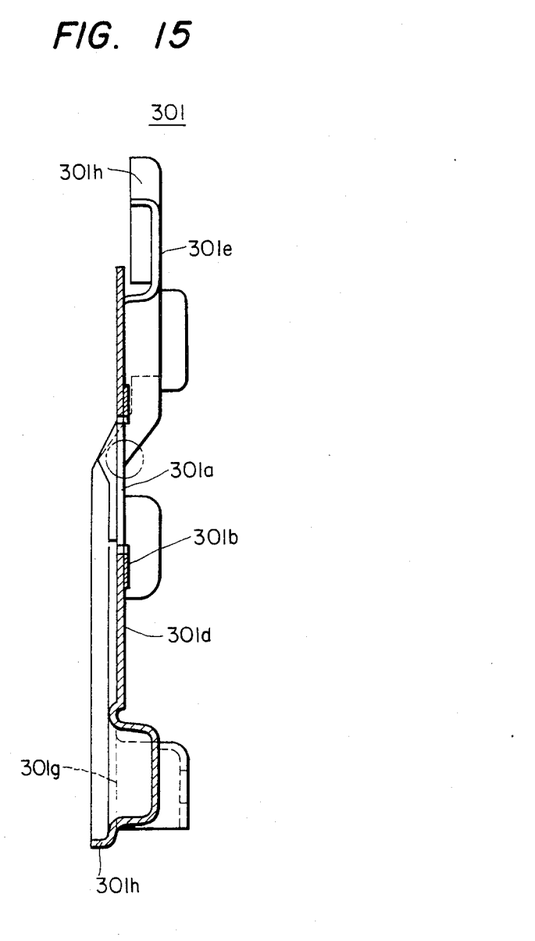
FIG. 15 a sectional view taken along the line XV—XV of FIG. 14.

As shown in FIGS. 14 and 15, the cam plate 301 is provided at its middle portion with a circular flat plane 301d for rotatably holding the cam plate cover 323. A flat portion 301e contiguous to the periphery of the plane 301d is formed therein with a notch 301f through which the operating rod 324 is movable. On the side of this periphery which is opposed to the notch 301f in the flat portion 301e, there is a substantially similar flat portion 301g contiguous to the circular flat plane 301d. The outer edge of the cam plate 301 is then bent at 301h toward a discharge outlet 335 formed between the rotary member 311 and the dust cover 330.

Accordingly, grass, earth and sand, mud and the like, which enter onto the cam plate 301 through between it and the dust cover 330, are guided on the flat portions of the cam plate 301, reaching the outer edge thereof and leaving the discharge outlet 335. Therefore, there is no substantial problems of such matters building up on the cam plate 301. An amount of oil coming from the engine is recieved on the cam plate 301, guided to the outer edge thereof, and leaves the discharge outlet trhough the bent portion 301h. Accordingly, clutch engagement and disengagement are effected in a reliable manner, since no oil is deposited onto the braking plane of the pressure plate 316, or the clutch lining 315 and brake lining 317 of the lining plate 313.

What is claimed is:
1. A clutch brake apparatus, comprising:
 a cam plate fixedly secured to an engine mounting;
 an engine output shaft extending through said cam plate;
 a rotatable member rotatably attached to said output shaft;
 a non-rotatable pressure plate mounted on said cam plate, axially movable along said output shaft;
 a clutch disk integrally rotatable with said output shaft, disposed between said pressure plate and said rotatable member;
 a lining plate between said clutch disk and said rotatable member, rotatable with said rotatable member and axially movable along said output shaft, comprising a brake lining for engaging said pressure plate at a portion thereof and a clutch lining for engaging said clutch disk;
 a brake spring extending in the direction parallel to said output shaft, between said pressure plate and said cam plate, for normally urging said pressure plate toward said rotary member and into engagement with said brake lining;
 a clutch spring disposed between said rotatable member and said lining plate urging said lining plate toward such clutch disk and said pressure plate;
 a rotatable cam plate cover opposed to said cam plate, axially movable along said output shaft and attached to said pressure plate;
 a cam ball between said cam plate and said cam plate cover;
 means for moving said pressure plate with said cam plate cover;
 an operation rod fixed to said cam plate cover for rotating the same to thereby move said cam plate cover away from said cam plate and move said pressure plate toward said cam plate against the force of the brake spring whereby said lining plate is engaged with said clutch disk by said clutch spring and is thereafter spaced from said pressure plate.

2. An apparatus as claimed in claim 1, wherein the pressure plate is configured so that the portion of the pressure plate engaging the brake lining is radially adjacent the outer edge of the clutch disk.

3. An apparatus as claimed in claim 1, wherein said pressure plate is provided with a plurality of circumferentially spaced projections radially outside of the portion of the pressure plate which contacts the brake lining.

4. An apparatus as claimed in claim 1, further comprising an outer dust cover having a configuration so that the portion of the dust cover adjacent said cam plate has a diameter at least 1.2 times as large as that of the cam plate, and the portion of the dust cover adjacent the rotatable member has a diameter at least 1.2 times as large as that of the rotatable member.

5. A clutch brake apparatus, comprising:
 a cam plate with an inclined ball clamp, fixed to an engine mounting;
 a rotatable cam plate cover with an inclined ball clamp, opposed to said cam plate;
 an operation rod for rotating said cam plate cover;
 an engine output shaft extending through said cam plate and said cam plate cover, said cam plate cover being axially movable along said output shaft;
 a cam ball between said cam plate and said cam plate cover, in the ball clamps of said cam plate and said cam plate cover, whereby rotation of said cam plate cover causes said cam ball to roll;
 a lining plate rotatable with respect to said output shaft, having a brake lining and a clutch lining;
 a pressure plate between said cam plate and said lining plate axially, movable along said output shaft, having a portion for engaging said brake lining, and comprising a retainer member axially movable along said output shaft with an end fixed rotatably to said cam plate cover;
 a clutch disk between said lining plate and said pressure plate, rotatable with said output shaft, for contacting said clutch lining;
 means for urging said lining plate axially toward said clutch disk and said pressure plate;
 a brake spring between said pressure plate and said cam plate extending parallel to said output shaft, for urging said pressure plate toward said lining plate so that said lining plate is spaced away from said clutch disk while said cam plate cover is urged toward said cam plate, rotation of said cam plate by said operation rod causing said cam plate cover to move away from said cam plate and said pressure plate to move toward said cam plate against said brake spring so that said lining plate moves into engagement with said clutch disk and thereafter said pressure plate moves away from said lining plate.

6. An apparatus as claimed in claim 5, wherein the pressure plate is configured so that the portion of the pressure plate engaging the brake lining is radially adjacent the outer edge of the clutch disk.

7. A clutch brake apparatus, comprising:

an engine output shaft;

a clutch disk rotatable with said output shaft;

a rotatable member rotatable with respect to said output shaft;

a lining plate rotatable with said rotatable member, having a clutch lining and a brake lining, capable of moving axially along said output shaft into engagement with said clutch disk;

a pressure plate axially movable along said output shaft for normally engaging the brake lining of said lining plate and moving said lining plate out of engagement with said clutch disk, comprising a plurality of circumferentially spaced projections on said pressure plate radially outside of the brake lining.

* * * * *